United States Patent
Joshi et al.

(10) Patent No.: US 10,078,579 B1
(45) Date of Patent: Sep. 18, 2018

(54) METRICS-BASED ANALYSIS FOR TESTING A SERVICE

(71) Applicant: Amazon Technologies, Inc., Seattle, WA (US)

(72) Inventors: Amol Madhav Joshi, Seattle, WA (US); Emily Kathryn Harbert, Seattle, WA (US); Krishnan Ananthanarayanan Kolazhi, Bellevue, WA (US); Justin Harlan Miller, Kirkland, WA (US); Alexandre Quesnel, Cambridge, MA (US); Onkar Bhaskar Walavalkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,795

(22) Filed: Jun. 26, 2015

(51) Int. Cl.
 G06F 9/44 (2018.01)
 G06F 11/36 (2006.01)
 G06F 8/70 (2018.01)

(52) U.S. Cl.
 CPC ............ G06F 11/3688 (2013.01); G06F 8/70 (2013.01)

(58) Field of Classification Search
 None
 See application file for complete search history.

(56) References Cited

U.S. PATENT DOCUMENTS

| | | | | |
|---|---|---|---|---|
| 8,140,477 B2* | 3/2012 | Moore, Jr. | ............ | G06Q 10/10 707/638 |
| 2007/0226546 A1* | 9/2007 | Asthana | ............ | G06F 11/3688 714/47.1 |
| 2007/0300208 A1* | 12/2007 | Furukawa | ............ | G06F 11/3672 717/127 |
| 2009/0199160 A1* | 8/2009 | Vaitheeswaran | ..... | G06F 11/3414 717/124 |
| 2011/0145795 A1* | 6/2011 | Khanapurkar | ....... | G06F 11/3414 717/126 |
| 2012/0042302 A1* | 2/2012 | Sikandar | ............. | G06F 11/3688 717/125 |

(Continued)

OTHER PUBLICATIONS

U.S. Appl. No. 14/751,074, filed Jun. 25, 2015, Onkar Walavalkar, et al.
U.S. Appl. No. 14/751,077, filed Jun. 25, 2015, Onkar Walavalkar, et al.
U.S. Appl. No. 14/805,382, filed Jul. 21, 2015, Andrew Ross Evenson, et al.

*Primary Examiner* — Daxin Wu
(74) *Attorney, Agent, or Firm* — Robert C. Kowert; Meyertons, Hood, Kivlin, Kowert & Goetzel, P.C.

(57) ABSTRACT

Techniques are described for determining test cases to test a service, such as a service to manage a purchase contract in an e-commerce environment. Log data may be generated during execution of the service to process requests, the log data indicating a plurality of code segments that executed during the execution of the service. The log data may be analyzed to generate metrics data comprising a plurality of records corresponding to the processed requests. A record may include any number of counters that each indicates whether, or how many times, a particular code segment executed during processing of a request. The metrics data may be analyzed to identify a subset of records comprising representative combinations of the counters in the metrics data. The requests corresponding to one or more of the subset of records may be replayed to test the service.

20 Claims, 8 Drawing Sheets

(56) References Cited

U.S. PATENT DOCUMENTS

| | | | |
|---|---|---|---|
| 2014/0344787 A1* | 11/2014 | Cochrane | G06F 11/3664 |
| | | | 717/125 |
| 2015/0169435 A1* | 6/2015 | Wu | G06F 11/3676 |
| | | | 717/131 |
| 2015/0347354 A1* | 12/2015 | Hatcher | G06F 17/30905 |
| | | | 715/234 |
| 2015/0363191 A1* | 12/2015 | Shanmugam | G06F 8/70 |
| | | | 717/101 |
| 2016/0085663 A1* | 3/2016 | Best | G06F 11/3684 |
| | | | 714/38.1 |
| 2016/0321158 A1* | 11/2016 | Bates | G06F 11/3636 |
| 2016/0321162 A1* | 11/2016 | Bates | G06F 11/3636 |

\* cited by examiner

METRICS-BASED ANALYSIS FOR TESTING A SERVICE

BACKGROUND

A business or other organization may deploy software to provide various services related to online shopping, electronic commerce, digital media delivery, gaming, communications, web search, social networking, and so forth. Such services may be provided through one or more software systems executing on the computing devices, as in a distributed software deployment on the computing devices. In some cases, distributed software may include front-end software that provides an interface with end-users, and back-end software that processes data received from the front-end software and generates data to be presented through the front-end software. An organization may employ personnel and computing resources in testing the software. Such testing may seek to identify broken functionality or sub-optimal performance of the software. Testing may also seek to identify aspects of the software that may lead to a potentially negative user experience, higher operational costs, inefficiency in operations, or other problems. An organization may at least partly automate its software testing processes to enable such processes to be performed more efficiently and with less operator involvement.

Figure 1:
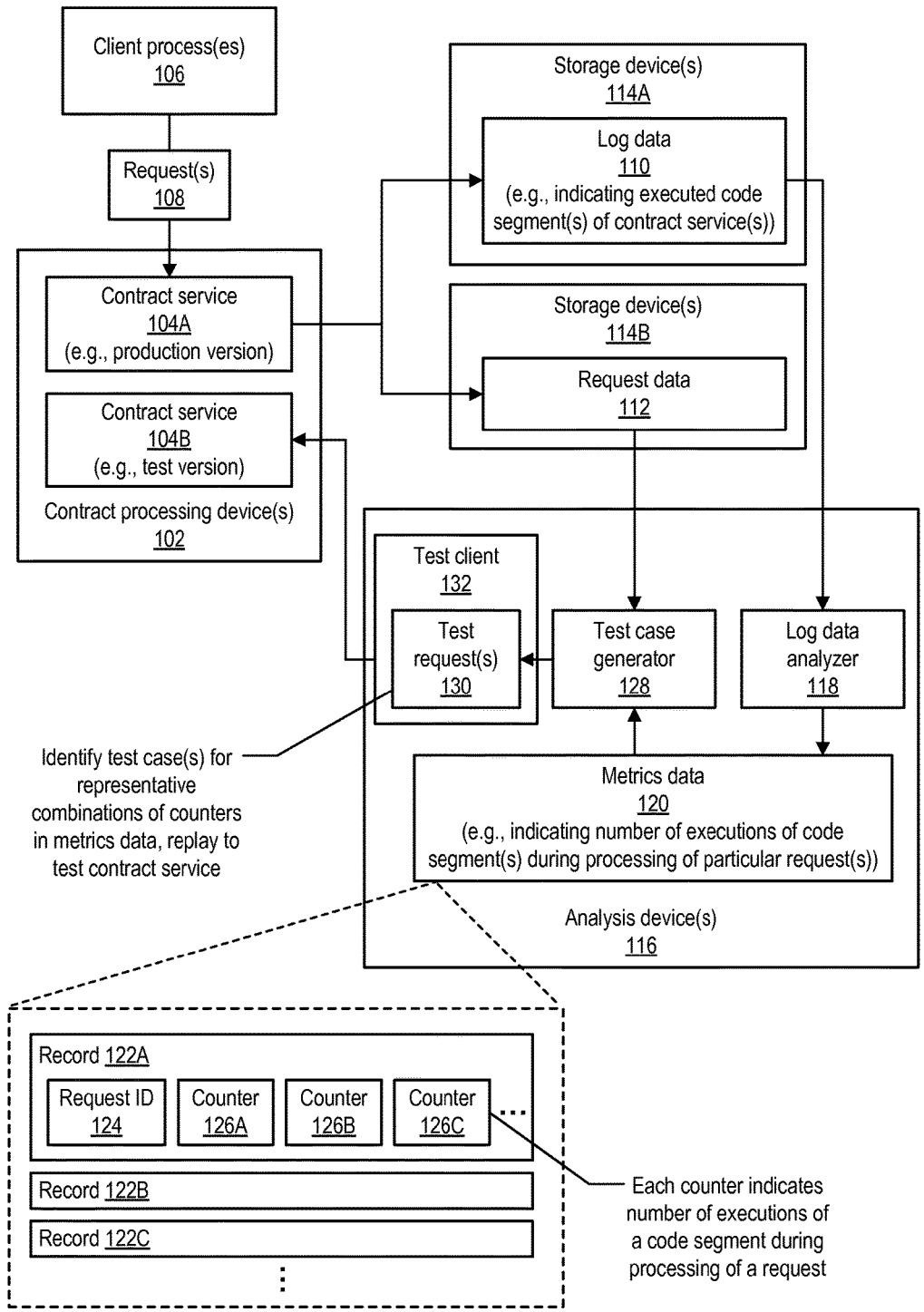
FIG. 1 is a block diagram illustrating an example system in which metrics data is employed to generate test cases for testing a service, according to embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems, devices, methods, and computer-readable media to generate test cases for testing a service based on an analysis of metrics data collected during execution of the service. Log data may be generated during execution of a production version of a service to process request(s) to the service. In some cases, the log data may be emitted by instructions present in the executable code of the service. Such instructions may be generated during compilation of source code lines inserted into the source code of the service by developers. Instructions to output log data may also be added to the executable code of the service by a compiler at compile time. In some cases, instructions to output log data may be injected into the executable code during the execution of the service. In some cases, log data may be generated by a mediator service that mediates calls between the service and other (e.g., remote) network services. The log data may be stored on storage device(s) and analyzed to generate metrics data. In some embodiments, the metrics data may include a plurality of records that each corresponds to a request processed by the service. A record may include a plurality of counters each corresponding to a code segment of the service. The value of a counter may indicate whether, or how many times, a code segment was executed during execution of the service. Accordingly, a record of the metrics data may provide an indication of those code segments of the service that were executed during processing of a particular request. The metrics data may be analyzed to identify a subset of one or more records that includes representative combination(s) of the counters among the records in the metrics data. The request corresponding to one or more of the identified record(s) in the subset may then be replayed to test a test version (e.g., a subsequent build) of the service in a test environment.

Through the identification of the various representative combinations of counters, and the generation of test cases based on the representative combinations of counters, embodiments provide a set of test cases that may cover a substantially complete set of the code paths that were traversed during the execution of the service. Traditional methods of identifying test cases may include a random selection of previously processed requests, and may therefore fail to generate test cases corresponding to infrequently traversed code paths (e.g., corner cases). Accordingly, embodiments may provide a set of test cases that test the service more completely than traditional methods and identify bugs that may otherwise go unnoticed. Embodiments also provide for the automatic identification of new test cases following the addition of new code or new features to the service. For example, a build of the service may include a new software module or portion of a software module, such as a class, method, code branch, subroutine, method call, and so forth. While the service is processing request(s), log data may be emitted that includes indications that the newly added code is being executed. Subsequent analysis of the log data may generate test cases that test the newly added code. Accordingly, embodiments provide for a flexible testing system that is able to adapt to new code that has been added into the service under test.

FIG. 1 illustrates an example environment in which one or more embodiments may operate. As shown in FIG. 1, the environment may include one or more contract processing devices 102. The contract processing device(s) 102 may execute one or more versions of a contract service 104. One or more client processes 106 may communicate one or more requests 108 to one or more versions of the contract service 104 executing on the contract processing device(s) 102. In some embodiments, the contract processing device(s) 102 may include one or more backend server devices that operate within a system for providing an e-commerce service to end-users. In such cases, the contract service 104 may include any number of software modules that execute to receive, generate, send, or otherwise process data related to a contract within the e-commerce service. For example, the contract service 104 may process a purchase contract or other type of contract arising from an end-user's selection of one or more items to be purchased via the e-commerce service. In some embodiments, the contract service 104 may be a backend service that is not directly accessible by end-users (e.g., customers). Alternatively, the contract service may provide a user interface (UI) or other features configured to interact directly with an end-user.

The client process(es) 106 may include front end processes that provide an interface, such as a web interface or other UI accessible by end-users. The action(s) of an end-user in the UI provided by the client process(es) 106 may generate the request(s) 108 that are processed by the contract service 104. For example, and end-user may select one or more items for purchase through an online store, e-commerce web site, e-commerce app, or other UI provided by the client process(es) 106. The client process(es) 106 may then generate the request(s) 108 to indicate that a purchase contract is to be created to manage the end-user's purchase of the item(s) through the UI. The contract service 104 may generate a contract object that includes data for the contract. In some cases, at least some of the data included in the contract object may be communicated to the client process(es) 106 and presented to the end-user whose action(s) caused the request(s) 108 to be sent. In some embodiments, the contract service 104 may be a data aggregation service that calls multiple network services (e.g., remote services) to generate or process data to be included in the contract object. Such a data aggregation service is described further with reference to FIGS. 2 and 3.

In some embodiments, the client process(es) 106 may execute on server computing device(s) to generate a UI that is communicated to, and presented on, and end-user device such as a tablet computer, smartphone, laptop computer, desktop computer, home entertainment system, and so forth. For example, the client process(es) 106 may include one or more web servers or application servers that generate and serve content for the UI. In some embodiments, the client process(es) 106 may execute on the end-user device(s), such as device(s) directly operated by customer(s) of an e-commerce service. For example, the client process(es) 106 may include one or more software components of an application, or app, executing on an end-user device. Such an application may be a native application that is configured to execute within the particular hardware and software configuration of the end-user device. The application may also be configured to execute on a variety of hardware or software configurations. In some cases, the client process(es) 106 may be configured to execute partly on an end-user device and partly on one or more server device(s) in communication with the end-user device.

In some embodiments, the contract processing device(s) 102 may be configured to execute one or both of a contract service 104A or a contract service 104B that are, respectively, a production version and a test version of the contract service 104. In some cases, the contract service 104A and the contract service 104B may be different versions, such as different revisions or different builds of the contract service 104. The contract service 104A and the contract service 104B may at least partly differ with regard to the executable code, features, or other aspects of the different versions. A production version of the contract service 104A may execute to process request(s) 108 generated based on actual end-user(s) (e.g., customer(s)) accessing the client process(es) 106. A test version of the contract service 104B may process request(s) that are generated through a testing process, such as test request(s) sent by a test script, test application, or other test module, or generated through manual testing. The test version of the contract service 104B may be a subsequent build or later version of the contract service 104 relative to the production version of the contract service 104A. In some cases, the contract service 104B may execute in a controlled test environment, on separate device(s) than those that execute the contract service 104A.

In some embodiments, the contract service 104A may generate log data 110 during execution of the contract service 104A. The log data 110 may be arranged in any format, and may indicate one or more code segments that executed during the operations of the contract service 104A to process the request(s) 108. For example, log data 110 may indicate that a particular line or block of code (e.g., source code or executable code) was accessed. The log data 110 may indicate that a particular function, method, or subroutine was called, entered, or exited during execution of the contract service 104A. In some cases, the log data 110 may indicate that a particular code branch was accessed during execution of the contract service 104A. For example, the log data 110 may indicate that an IF branch or an ELSE branch was accessed during execution of a section of code that includes an IF/ELSE block of code. As another example, the log data 110 may indicate that a TRY branch or a CATCH branch was accessed during execution of a section of code that includes a TRY/CATCH block of code. Log data 110 may also indicate that other type of conditional code segments were accessed.

Embodiments support the use of log data 110 generated from a variety of sources. In some cases, the log data 110 may be generated by instructions included in the executable code of the contract service 104A. Such instructions may be based on source code line(s) inserted into the source code of the contract service 104A by a developer or other individual(s). For example, a developer may write a line of code println ("I am in classX.methodY") into the source code of the contract service 104A, e.g., within the implementation of a particular method in a particular class. The line of code may compile to generate one or more executable instructions within the executable code of the contract service 104A. During execution of the contract service 104A, the executable instruction(s) may output (e.g., to standard output, standard error, a file, a console, and so forth) "I am in classX.methodY" when the code for a particular method is executed. Such output may be captured as a portion of the log data 110 in log files written when the contract service 104A executes. In some embodiments, the instruction(s) to write log data 110 may be inserted into the executable code of the contract service 104A, by a compiler or other build process, during the compilation of the source code for the contract service 104A. In such cases, the instruction(s) may be injected or otherwise added by a compiler even when there is no source code corresponding to the instruction(s). A build process may specify a compiler option such that the instruction(s) are added to the executable code that is generated during the build process.

In some embodiments, the instruction(s) may be injected into the executable code of the contract service 104A while the contract service 104A is executing. For example, in cases where the contract service 104A executes within a virtual machine, runtime engine, or other execution container, the execution container may emit log data 110 to indicate accessed code segment(s) of the contract service 104A. In some embodiments, instruction(s) to output log data 110 may be automatically added into branches of conditional statements, calls to methods, class constructors, or elsewhere in the generated code, at compile time or at run time.

In some embodiments, the log data 110 may be generated by external processes that have access to information regarding the execution of the contract service 104A. For example, calls from the contract service 104A to other service(s) may be monitored, mediated, or otherwise managed through a mediator service, and the mediator service may generate log data 110 describing the various calls made by the contract service 104A. Such embodiments are described further with reference to FIG. 3.

The log data 110 may include any amount or type of information to indicate accessed code segment(s) of the contract service 104A. For example, the log data 110 may identify a code segment by one or more of the following: package name, class name, method name, subroutine name, code branch traversed, line of code, block of code, line number, or other identifications. The log data 110 may include the values of one or more variables or parameters when the code segment is reached, such as parameter(s) of a method call, or value(s) returned from a method call. The log data 110 may also include a timestamp (e.g., date, time, or date and time) indicating when the code segment was accessed. In some cases, the log data 110 may indicate a build number, version number, build date, revision number, or other indication of the particular version of the contract service 104A. The log data 110 may also include other information. The log data 110 may be generated by the contract service 104A itself, or by other processes that have access to information regarding the execution of the contract service 104A. In some embodiments, the log data 110 for a request 108 may include a request identifier (ID) that identifies (e.g., uniquely identifies) the request 108 among a plurality of requests 108.

In some embodiments, request data 112 may be generated during execution of the contract service 104A. The request data 112 may include at least a portion of the data included with the request(s) 108, and may enable the request(s) 108 to be substantially replayed during testing of the contract service 104B. In cases where the request(s) 108 are communicated using a particular protocol such as a version of HyperText Transfer Protocol (HTTP), the request data 112 may include the request(s) 108 formatted according to the protocol. The request data 112 for a request 108 may include one or more of the following: an indication of the communication protocol used to communicate the request 108; a network address or location, such as a Uniform Resource Locator (URL), Uniform Resource Name (URN), or other Uniform Resource Indicator (URI), or an Internet Protocol (IP) address; a path to a requested resource; one or more parameters; one or more headers; one or more cookies; or other information. The request data 112 for a request 108 may also include the request ID identifying the particular request 108 from which the request data 112 was captured. The request data 112 may be generated by the contract service 104A itself, or by another process that has access to information regarding the request(s) 108 received by the contract service 104A. For example, the request data 112 may be captured and stored by a communications interface that conveys the request(s) 108 from the client process(es) 106 to the contract service 104A. In some cases, the request data 112 for a particular request 108 may include a timestamp indicating when the request 108 was received by the contract service 104A.

One or both of the log data 110 or the request data 110 may be stored on one or more storage devices 114. The storage device(s) 114 may store data in any format, using any type of storage technology. For example, the storage device(s) 114 may store data in a relational or non-relational storage format. One or both of the log data 110 or the request data 112 may be stored in a compressed format. One or both of the log data 110 or the request data 112 may be stored in an encrypted format.

In some embodiments, separate datastores or separate sets of data storage device(s) 114A and 114B may be employed to respectively store the log data 110 and the request data 112. For example, the storage device(s) 114A may be tasked with storing the log data 110 generated during execution of the contract service 104A. The storage device(s) 114A may be associated with the contract process device(s) 102. In some cases, the storage device(s) 114A may be component(s) of the contract processing device(s) 102. The storage device(s) 114B may be separate from the contract processing device(s) 102. Using separate sets of storage device(s) 114A and 114B to respectively store the log data 110 and the request data 112 may contribute to the scalability of one or both of the log data 110 or the request 112, enabling storage of larger amounts of data.

As shown in FIG. 1, the environment may include one or more analysis devices 116. The analysis device(s) 116 may include any type of computing device(s). The analysis device(s) 116 may execute a log data analyzer 118. The log data analyzer 118 may access and analyze the log data 110 to generate metrics data 120 that indicates a number of executions of one or more code segments during the processing of one or more requests 108. As described above, and as illustrated in FIG. 1, the metrics data 120 may include any number of records 122. Each record 122 may include a request ID 124 identifying a particular request 108 processed by the contract service 104A. Each record 122 may also include any number of counters 126 that each indicates whether, or how many times, a particular code segment was executed during the processing of the request 108 identified by the request ID 124. In some embodiments, a counter 126 for a code segment may have a Boolean value (e.g., true or false, 0 or 1, etc.) that indicates whether the code segment was executed zero times or at least one time. In some embodiments, a counter 126 may have a value (e.g., numeric value) indicating a number of times the code segment was executed, such that the value may be zero or higher. In some embodiments, the metrics data 120 may be arranged, and stored, in a relational database table such that the records 122 correspond to rows in the table, the request ID 124 may be a primary key of the table, and the counters 126 correspond to columns in the table. In some embodiments, the metrics data 120 may be stored in the storage device(s) 114 or elsewhere.

The metrics data 120 may be accessed by a test case generator 128 executing on the analysis device(s) 116. The test case generator 128 may identify a subset of the records 122 of the metrics data 120, the subset including records 122 that exhibit representative combinations of the values of the counters 126 among all the records 122 of the metrics data 120. For example, the metrics data 120 may include five different records 122 (e.g., for five different requests 108) that each exhibits counter values "3", "1", and "0" for three counters 126. The test case generator 128 may generate a subset of records 122 that includes a representative one of the five records 122 that exhibits the particular counter values. In this way, the test case generator 128 may collapse the metrics data 120 into a representative subset of the metrics data 120 that includes one record 122 for each of the combinations of counter values present in the full metrics data 120. Accordingly, the representative subset of the metrics data 120 may include a plurality of records 122 that are unique among the records 122 in the representative subset. For each of the records 122 in the subset, the test case generator 128 may generate a test request 130, also described herein as a test case. The test case generator 128 may access the request data 112 for the request ID 124 of a record 122 in the representative subset, and incorporate the request data 112 into the test request 130. The test request 130 may then be employed, as a test case, to test a test version of the contract service 104B. Accordingly, embodiments may identify each combination of counters 126 present in the metrics data 120, and for each combination replay the corresponding request data 112 as a test request 130 to test the contract service 104B.

In some embodiments, a test client 132 may execute to replay the test request(s) 130 on the contract service 104B under test. The test client 132 may execute, e.g., in a test environment, to substantially mimic the behavior of the client process(es) 106 sending request(s) 108. Although FIG. 1 depicts the test client 132 as a software module executing on the analysis device(s) 116, embodiments are not so limited. In some embodiments, the test client 132 may run on a separate set of one or more computing device(s), such as dedicated test server(s).

Although FIG. 1 depicts the contract processing device(s) 102, analysis device(s) 116, and storage device(s) 114 as separate devices in the environment, embodiments are not so limited. The operations performed by the contract processing device(s) 102, analysis device(s) 116, and storage device(s) 114 may be distributed across any number of computing devices, or on a same device or cluster of devices.

Figure 2:
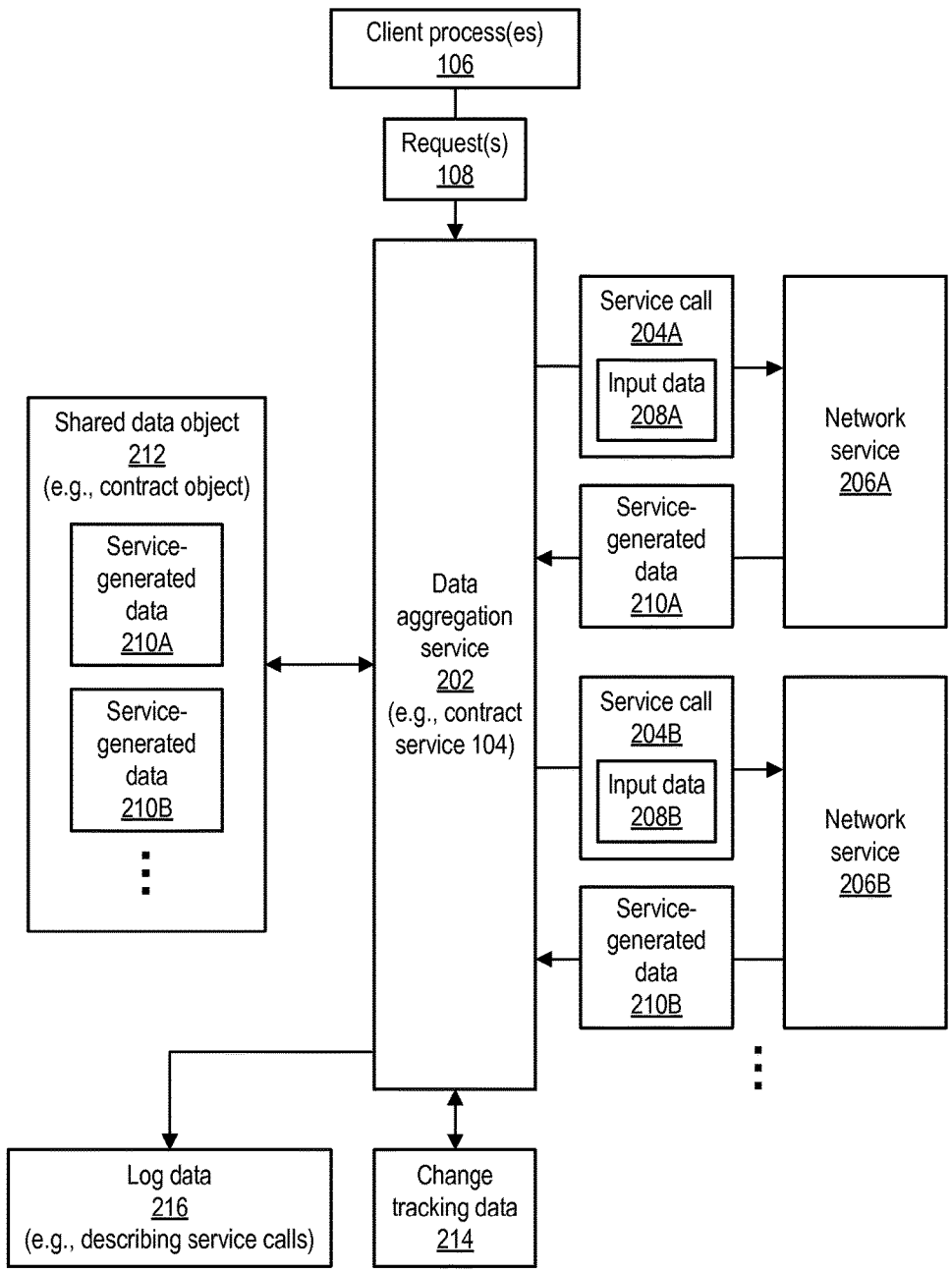
FIG. 2 is a block diagram illustrating a data aggregation service that calls multiple network services to populate a shared data object, according to embodiments.

FIG. 2 is a block diagram illustrating an example of a data aggregation service 202 that calls multiple network services 206 to populate a shared data object 212, according to embodiments. In some embodiments, the contract service 104 (e.g., one or both of the contract service 104A or the contract service 104B) may comprise a data aggregation service 202 executing on the contract processing device(s) 102. On receiving a request 108 from the client process(es) 106, the data aggregation service 202 may generate a shared data object 212 to store data associated with the request 108. For example, in cases where the request 108 indicates a purchase of one or more items through an e-commerce service, the shared data object 212 may be a contract object including data describing one or more aspects of the contract governing the purchase. The contract object may store any amount of data that describes any aspect of the contract including, but not limited to, the purchase price, taxes, discounts, gift information, item(s) to be purchased, description of item(s), quantity of item(s) to be purchased, availability of item(s), shipping date or time estimate, shipping method, requested delivery period, seller of the item(s), manufacturer of the item(s), buyer's name, recipient's name, buyer's location, recipient's location, shipping address, payment information, and so forth.

On receiving the request 108, the data aggregation service 202 may create an initial shared data object 212. The initial shared data object 212 may include information that the data aggregation service 202 is able to determine based on the request 108 itself, but the initial shared data object 212 may otherwise be a shell object in which subsequently generated data is to be written. To populate the shared data object 212, the data aggregation service 202 may perform any number of service calls 204 to one or more network services 206. Each service call 204 may include input data 208, and may call a network service 206 that is configured to process the input data 208 and generate service-generated data 210. For example, the data aggregation service 202 may perform a service call 204A to that includes input data 208A describing the purchase price of item(s) in a purchase, and location information regarding the buyer. The service call 204A may be to a network service 206A that is configured to calculate an amount of tax to be paid with the purchase, based on the purchase price and the location information, or other input data 208A. The network service 206A may generate and return service-generated data 210A that includes the calculated amount of tax. The data aggregation service 202 may then incorporate the received service-generated data 210A into the shared data object 212. Alternatively, one or more network services 206 may have (e.g., direct) access to the shared data object 212, and may be configured to add the service-generated data 210 into the shared data object 212 without sending the service-generated data 210 to the data aggregation service 202.

The network service(s) 206 may be configured to perform operations including, but not limited to, one or more of the following: calculate taxes based on purchase price, location, or other input data; determine availability of item(s) to be purchased; determine an estimated delivery time, date, or time and date for delivering purchased item(s); validate or process a gift certificate, credit card, bank card, store credit, or other method of purchase; process gift information, such as a gift certificate amount, gift message, gift wrapping options, and so forth; determine address information, contact information, or other stored data associated with a buyer or recipient of a purchase; determine information describing the seller, manufacturer, distributor, or other entity associated with the item(s); or other operation(s).

In some embodiments, the network service(s) 206 may be remote with respect to the data aggregation service 202, executing on different computing device(s) than the data aggregation service 202. In such cases, the service call(s) 204 and the service generated data 210 may be communicated over one or more networks such as wide area networks (WANs) or local area networks (LANs). In some cases, one or more of the service call(s) 204 or the service-generated data 210 may be encrypted for communication. In some embodiments, one or more of the network services 206 may be a local service with respect to the data aggregation service 202, such that the network service(s) 206 execute on a same computing device or cluster of devices as the data aggregation service 202.

In some embodiments, the data aggregation service 202 may generate change tracking data 214. The change tracking data 214 may describe the service-generated data 210 that has been added to the shared data object 212. The change tracking data 214 may also describe one or more portions of service-generated data to be added to the shared data object 212. Accordingly, the change tracking data 214 may be described as a task list comprising: completed tasks, for which the service-generated data 210 has been added to the shared data object 212; and incomplete tasks, for which the service-generated data 210 has not yet been generated or added to the shared data object 212. The change tracking data 214 may indicate when particular instances of service-generated data 210 were added to the shared data object 212, and which network service(s) 206 generated the service-generated data 210. The change tracking data 214 may also indicate when the service call(s) 204 were made to the network service(s) 206 to request determination of service-generated data 210 to be added to the shared data object 212.

In some embodiments, the data aggregation service 202 may generate log data 216 describing the service call(s) 204 made to the network service(s) 206 to populate the shared data object 212 for a particular request ID. The log data 216 may also describe the input data 208 sent to the network service(s) 206, or the service-generated data 210 provided by the network service(s) 206. The log data 216 may be stored, accessed, and processed as part of the log data 110 to generate test request(s) 130.

Figure 3:
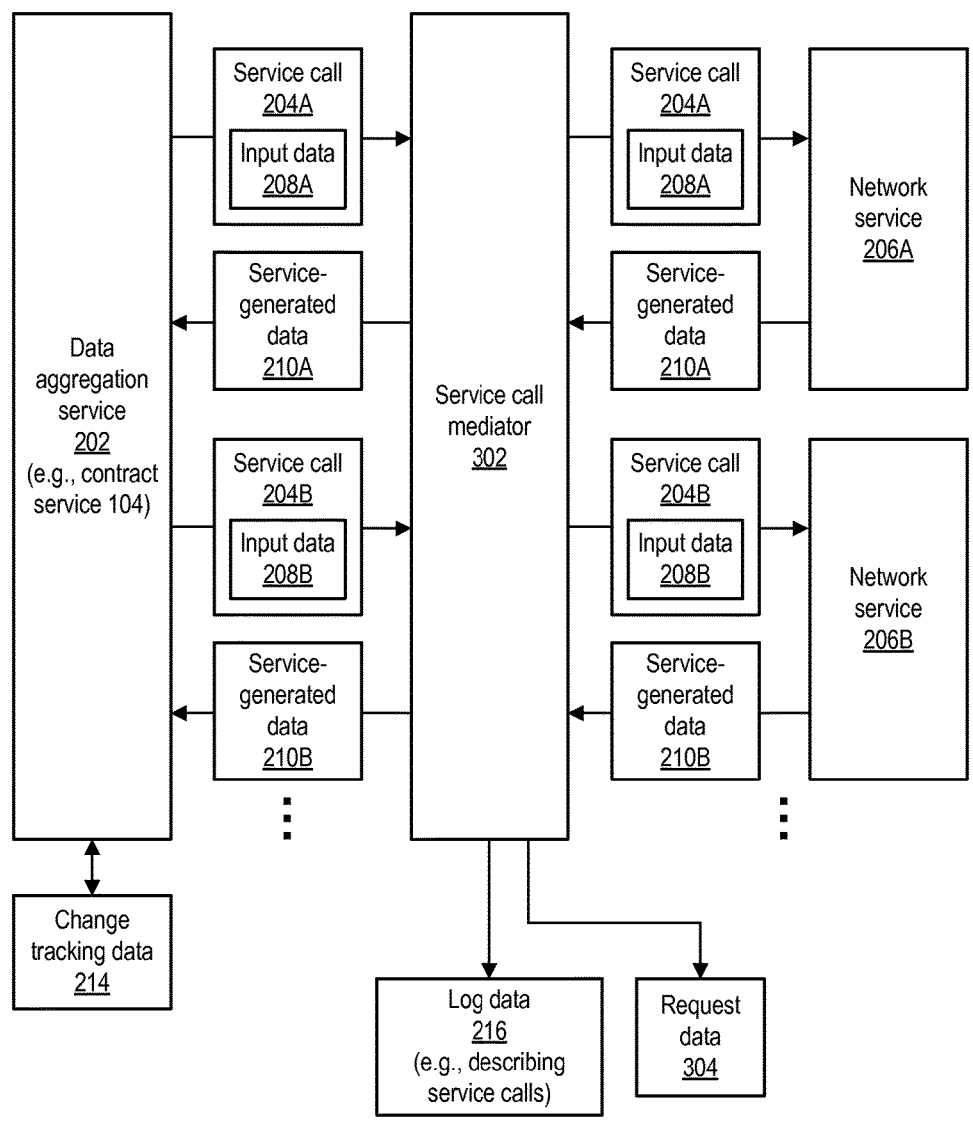
FIG. 3 is a block diagram illustrating a data aggregation service that calls multiple network services via a service call mediator to populate a shared data object, according to embodiments.

FIG. 3 is a block diagram illustrating a data aggregation service 202 that calls multiple network services 206 via a service call mediator 302 to populate a shared data object 212, according to embodiments. Elements in FIG. 3 may be configured similarly to like-numbered elements of FIG. 2, or may perform similar operations to those performed by like-numbered elements of FIG. 2. FIG. 3 illustrates embodiments in which a service call mediator 302 is employed to manage, convey, or otherwise mediate the service calls 204 made by the data aggregation service 202 to the network service(s) 206. In such embodiments, the data aggregation service 202 may send service call(s) 204 to the service call mediator 302, which may then forward the service call(s) 204 to the appropriate network service(s) 206. The service call mediator 302 may receive the service-generated data 210 provided by the network service(s) 206 in response to the service call(s) 204, and forward the service generated data 210 to the data aggregation service 202. In the example of FIG. 3, the log data 216 describing the various service call(s) 204 may be generated by the service call mediator 302 and stored in the storage device(s) 114 or elsewhere. In some embodiments, the service call mediator 302 may also generate request data 304. The request data 304 may include information describing the service call(s) 204 made from the data aggregation service 202 to the network service(s) 206, as mediated by the service call mediator 302. In some cases, the service call mediator 302 may also capture and emit request data 304 describing the request(s) 108 made from the client process(es) 106 to the contract service 104A. The request data 304 may be employed in subsequent test case generation as described herein.

The service call mediator 302 may execute on the same computing device(s) as the data aggregation service 202, or on different computing device(s). Embodiments may employ the service call mediator 302 to mediate all the service call(s) 204 made by the data aggregation service 202 to the network service(s) 206. Alternatively, embodiments may employ the service call mediator 302 to mediate one or more of the service call(s) 204 made by the data aggregation service 202, while other service call(s) 204 are sent by the data aggregation service 202 to the network service(s) 206 without using the service call mediator 302.

The data aggregation service 202 shown in FIGS. 2 and 3 may be configured to generate, maintain, update, and provide a shared data object 212. In some embodiments, the data aggregation service 202 might be utilized in conjunction with software components and hardware devices that provide e-commerce functionality. For example, and without limitation, the technologies disclosed herein may be utilized with an online shopping or other e-commerce module (not shown) that provides a web site or other type of site for online shopping. The online shopping module may be configured to maintain and utilize an item catalog data store (e.g., an "item catalog") that stores records for items available for purchase through the web site. The web site may also provide functionality for browsing and searching for web pages corresponding to items in the item catalog, for purchasing the items, and for performing other functions. The technologies disclosed herein might also be utilized with other types of e-commerce systems. In this regard, it should be appreciated that the configurations disclosed herein are not limited to use by e-commerce systems and may be utilized to optimize the process of data aggregation in other technical environments.

In cases where the data aggregation service 202 is utilized in conjunction with an online shopping module, such as that described above, the shared data object 212 may be utilized to store data associated with a customer purchase such as purchase contract data. For example, and without limitation, the service-generated data 210, and other information in the shared data object 212, may describe items to be purchased by the customer, payment information, customer information such as a billing or delivery address, or other types of information relating to a purchase contract.

The data aggregation service 202 may obtain the data to be stored in the shared data object 212 from any number of the network services 206. For example, and without limitation, the data aggregation service 202 might make one or more service calls 204 that comprise one or more input values of input data 208 to the network service(s) 206. In response to the service call(s) 204, the network service(s) 206 may perform various types of processing to generate instances of the service-generated data 210 for inclusion in the shared data object 212. Various other services may then access at least a portion of the data stored in the shared data object 212. In some cases, the client process(es) 106 may access data of the shared data object 212 and present such data through a UI, such as through an online shopping website. For example, the client process(es) 106 may access data regarding delivery or shipping estimated, calculated tax to be paid, item(s) descriptions, or other data after the data has been stored in the shared data object 212, and present the data to an end-user in an e-commerce web site or other UI.

When utilized in conjunction with an e-commerce system, the network service(s) 206 may be configured to provide various types of information about a customer purchase for storage in the shared data object 212 and use by the client process(es) 106 or other services. For example, and without limitation, one network service 206A may be utilized to provide service-generated data 210A that includes a customer's shipping address, while another network service 206B may be configured to provide service-generated data 210B that includes information about the item(s) to be purchased. Other services 206 may compute the sales tax for the purchase, the shipping cost, or the total purchase price for the purchase, and return the computed information as the service-generated data 210 to the data aggregation service 202. Other service(s) 206 may provide other types of data. The service-generated data 210 returned by the network service(s) 206 may be stored in the shared data object 212. The data aggregation service 202 may also provide functionality enabling the client process(es) 106 or other services to retrieve or modify the data stored in the shared data object 212.

In some cases, the types or instances of data stored in the shared data object 212 may have various interdependencies, such that the modification of one portion or instance of service-generated data 210 may cause the updating of other portion(s) or instance(s) of service-generated data 210. For example, if data is added to the shared data object 212 describing an additional item to be purchased by a customer, additional network service call(s) 204 may be made to network service(s) 206 to update the data in the shared data object 212 describing the total order price, the shipping cost, delivery estimates, whether free shipping is available, or other types of information. Other service call(s) 204 may be made based upon other changes or additions to the data in the shared data object 212.

To update the data in the shared data object 212, the data aggregation service 202 may make one or more service calls 204 to the appropriate network service(s) 206. In some cases, a short period of time may have elapsed since a previous service call 204 such that the input data 208 to a network service 206 may not have changed since the previous call, and such that the service-generated data 210 returned by the network service 206 is not likely to have changed. For example, if the items in a customer purchase from an e-commerce merchant have not changed, then there may be a high probability that there is no change in the shipping cost for the item(s), unless other data has since changed that may impact the shipping cost, such as the shipping address. In this example, a service call 204 may be made to a network service 206 unnecessarily, thereby increasing latency or reducing availability of the network service 206 or the data aggregation service 202. This may be particularly true when there is a large amount of data in the shared data object 212 or when there are a large number of network services 206 to be called. Accordingly, in some embodiments at least a portion of the service-generated data 210 may be accessed from a cache instead of repeating a service call 204 to a network service 206, in cases where the service-generated data 210 is unlikely to have changed since a previous call. In some embodiments, the data may be cached with a time-to-live (TTL) indicating how long since the data has been cached and how fresh the cached data is. Cached data with a high TTL may be not used, and instead a service call 204 may be made to request updated service-generated data 210 from the network service 206. Older cached data may be purged from the cache, and replaced with updated service-generated data 210.

Another mechanism that the data aggregation service 202 may utilize to avoid unnecessary network service calls 204 to network services 206 involves the use of the change tracking data 214. In some embodiments, the data aggregation service 202 may be configured to track changes to data in the shared data object 212. For example, and without limitation, the data aggregation service 202 might maintain the change tracking data 214 that describes the changes to the various instances of service-generated data 210 in the shared data object 212. When the data aggregation service 202 determines that a second or subsequent call to a network service 206 may be necessary (e.g. as a result of the modification of data in the shared data object 212), the data aggregation service 202 may employ the change tracking data 214 to determine whether the data in the shared data object 212 that is used as input data 208 to the network service 206 has changed since the previous service call 204 to the network service 206. If the change tracking data 214 indicates that the input data 208 has not changed, the data aggregation service 202 may not make an additional service call 204 to the network service 206. The caching mechanism and the change tracking mechanism described above may be utilized in any combination in some embodiments.

The data aggregation service 202 may also utilize a filtering mechanism to perform caching on a more granular level than at the level of a single instance of service-generated data 210, and to make communication with the network service(s) 206 more efficient. The network service(s) 206 may be configured to provide filtering data to the data aggregation service 202. The filtering data may describe the specific data from the shared data object 212 that each network service 206 utilizes. For example, and without limitation, a network service 206A might provide filtering data indicating that the network service 206A should be subsequently called if (e.g., only if) particular field(s) of data are changed in the shared data object 212. Similarly, a network service 206B might provide filtering data indicating that the network service 206B is to be subsequently called if other field(s) are changed. Based on the filtering data, the data aggregation service 202 may call network service(s) 206 a subsequent time if the data specified by the network service(s) 206 in the filtering data has changed (and the associated TTL has not elapsed). Additionally, the data aggregation service 202 may utilize the filtering data to minimize the amount of data sent to a network service 206 in a service call 204. For example, the field(s) specified in the filtering data may be provided to the network service(s) 206 as input data 208.

In some cases, the data aggregation service 202 may be configured to be expandable to support additional network service(s) 206 providing additional service-generated data 210. In some embodiments, a new network service 206 may register itself with the data aggregation service 202 to indicate one or more of: the particular service-generated data 210 that may be provided by the network service 206; or the particular input data 208 that may be sent to request the service generated data 210. Following registration, the data aggregation service 202 may then begin sending service call(s) 204 to the newly registered network service 206 to request service-generated data 210 to populate the shared data object 212. Accordingly, the data aggregation service 202 may be described as having a pluggable architecture to facilitate bringing new network service(s) 206 online, and the network service(s) 206 may be described as plug-in(s) to the data aggregation service 202.

Figure 4:
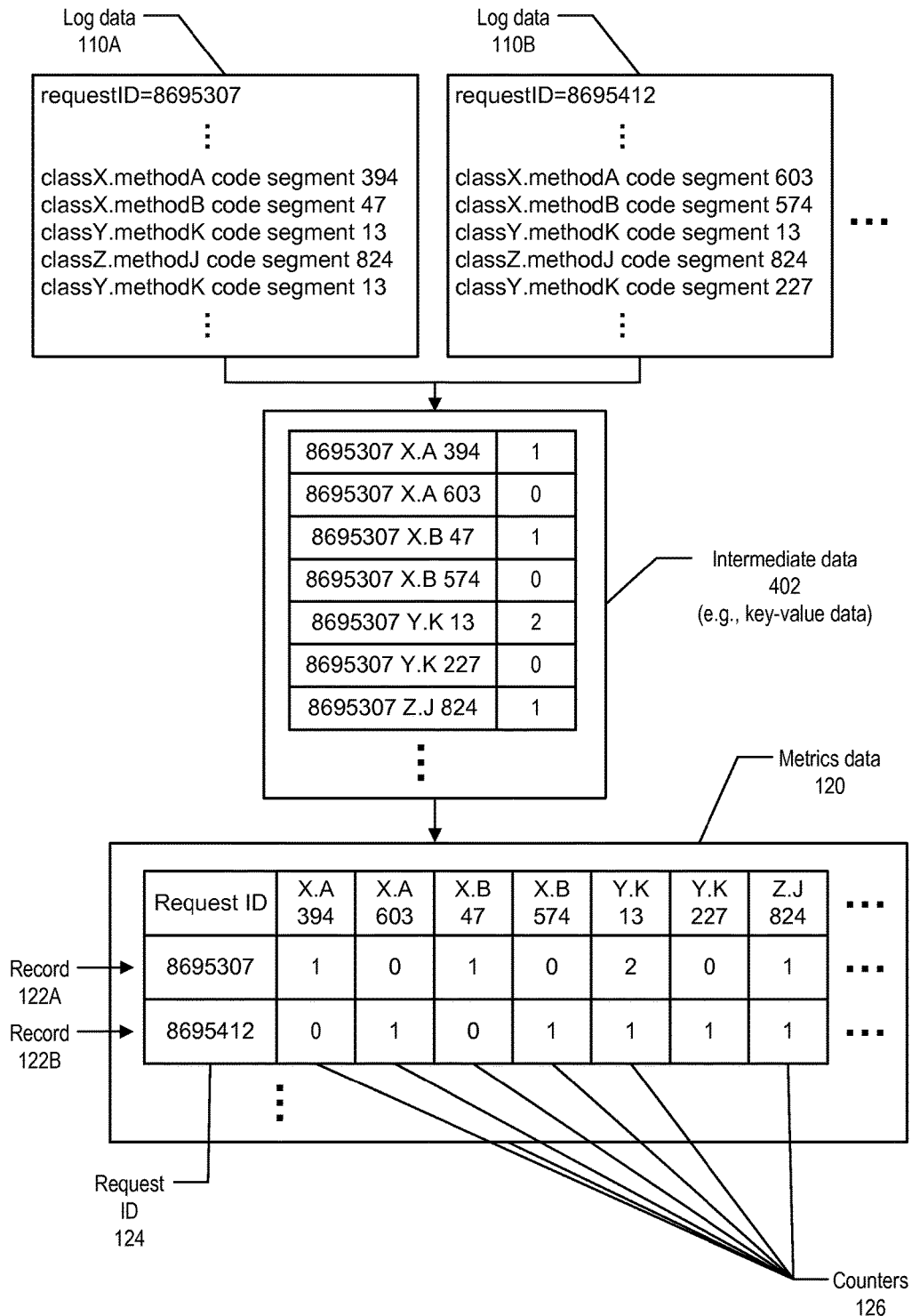
FIG. 4 is a block diagram illustrating an example of analyzing log data to generate metrics data, according to embodiments.

FIG. 4 is a block diagram illustrating an example of analyzing log data 110 to generate metrics data 120, according to embodiments. In the example shown, the log data analyzer 118 accesses log data 110A and log data 110B that describe code segments executed during the processing of two different requests 108 having different request IDs 124. The log data analyzer 118 may analyze log data 110 associated with any number of requests 108. The log data analyzer 118 generates the metrics data 120 that includes records 122A and 122B respectively corresponding to the two requests 108. The log data analyzer 118 may examine the log data 110 for each request 108. For each instance where the log data 110 indicates that a code segment has been executed during processing of a request 108, the log data analyzer 118 may update the record 122 for the request 108 by incrementing a counter 126 associated with the code segment. Accordingly, each record 122 may comprise a summary of the code segments executed during the processing of the corresponding request 108.

Although FIG. 4 depicts the metrics data 120 as being arranged in a relational table, embodiments support the use of other data formats or data structure to store the metrics data 120, the log data 110, or any number of data sets that are intermediate between the log data 110 and the metrics data 120. In some embodiments, the log data 110 may not explicitly identify a particular class or a particular method in which the code segment may be found, as in the example of FIG. 4. In some cases, the log data 110 may include descriptive information regarding the operations being performed in the code segment during its execution. In some embodiments, the particular location of the code segment in the executable code may be inferred based on this descriptive information. In some cases, the log data 110 may indicate a particular code branch that is being followed, such as whether the execution is in an IF or ELSE branch, whether the execution is in a TRY or CATCH branch, and so forth. The particular example of the log data 110 shown in FIG. 4 is not limiting of embodiments.

In some embodiments, the log data 110 may be initially processed to generate intermediate data 402 in a key-value format. As shown in the example of FIG. 4, a record of the intermediate data 402 may include a key that is a combination of the request ID (e.g., "8695307") and a code segment ID (e.g., "X.A 394"). The record of the intermediate data 402 may include a value that is the value of the counter 126 corresponding to the request ID and the code segment. In the example of FIG. 4, the record 122A for request ID "8695307" in the metrics data 120 may correspond to seven key-value records in the intermediate data 402. Each of the seven records may correspond to a different code segment, and the value of each of the seven records may be the value of the counter 126 indicating a number of executions of the code segment, or whether the code segment executed at least once. In embodiments that employ the intermediate data 402, or other intermediate data sets, the records of the intermediate data 402 corresponding to a particular request ID may be joined or otherwise combined to generate a record of the metrics data 120. The processing of the log data 110 to generate one or both of the intermediate data 402 or the metrics data 120 may be performed by the log data analyzer 118 or other software module(s). Use of the intermediate data 402 in a key-value format may facilitate the addition of additional code segments to be tracked in the intermediate data 402 and the metrics data 120.

Figure 5:
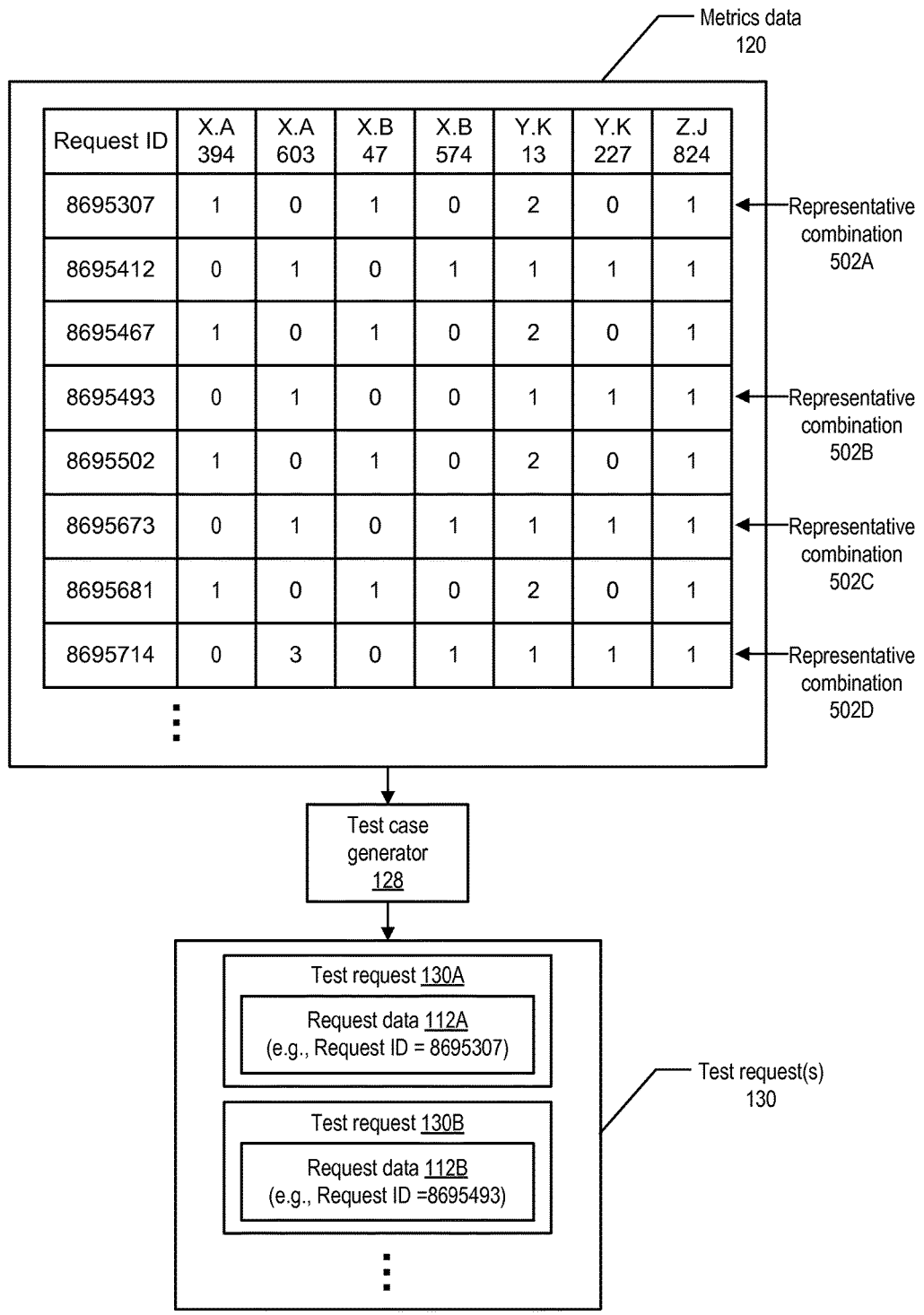
FIG. 5 is a block diagram illustrating an example of generating test cases such as test requests based on an analysis of metrics data, according to embodiments.

FIG. 5 is a block diagram illustrating an example of generating test cases such as the test request(s) 130 based on an analysis of the metrics data 120, according to embodiments. The test case generator 128 may access the metrics data 120 generated as described above with reference to FIG. 4. The test case generator 128 may determine a representative subset of the metrics data 120 that includes those records 122 that exhibit a representative combination 502 of the values of the counters 126. In the example of FIG. 5, the metrics data 120 includes four records 122 that have counter values of "1", "0", "1", "0", "2", "0", and "1". The test case generator 128 may select a representative one of the four records 122 to include in the representative subset of records 122 to be used in test case generation. For each of the records 122 in the representative subset, the test case generator may retrieve the request data 112 corresponding to the request ID 124 in the record 122. The test case generator 128 may generate a test request 130 that includes the request data 112 for one or more of the records 122 in the subset of representative combinations 502. Accordingly, as shown in the example of FIG. 5, the test requests 130 may include a test request 130A that comprises the request data 112A previously recorded for request ID "8695307", and a test request 130B that comprises the request data 112B previously recorded for request ID "8695493". The test requests 130 may then be sent to the contract service 104B, e.g., replayed via the contract service 104B, to test the contract service 104B. In some embodiments, the intermediate data 402 may be analyzed to generate the test request(s) 130, e.g., without generating or using the metrics data 120. One or more of the log data 110, the intermediate data 402, or the metrics data 120 may be stored on the storage device(s) 114. In some cases, one or more of the log data 110, the intermediate data 402, or the metrics data 120 may be stored in a data warehouse or other storage that employs a non-relational data storage format.

The examples of FIGS. 4 and 5 are not limiting of embodiments. One or both of the log data 110 or the metrics data 120 may include different information, or may be arranged in a different format, than shown in FIGS. 4 and 5. Although the examples of FIGS. 4 and 5 depict the metrics data 120 in table form, e.g., arranged as in a relational database table, embodiments support other formats and arrangements for the metrics data. The metrics data 120 may include any number of counters 126 corresponding to different code segments. In some cases, the metrics data 120 may include a large number such as thousands of counters 126. FIGS. 4 and 5 depict a smaller number of counters 126 solely for clarity of illustration. In some embodiments, as described above, the metrics data 120 may include counters 126 that hold a Boolean value to indicate whether or not a particular code segment has executed at least once or not executed during processing of a request 108.

Figure 6:
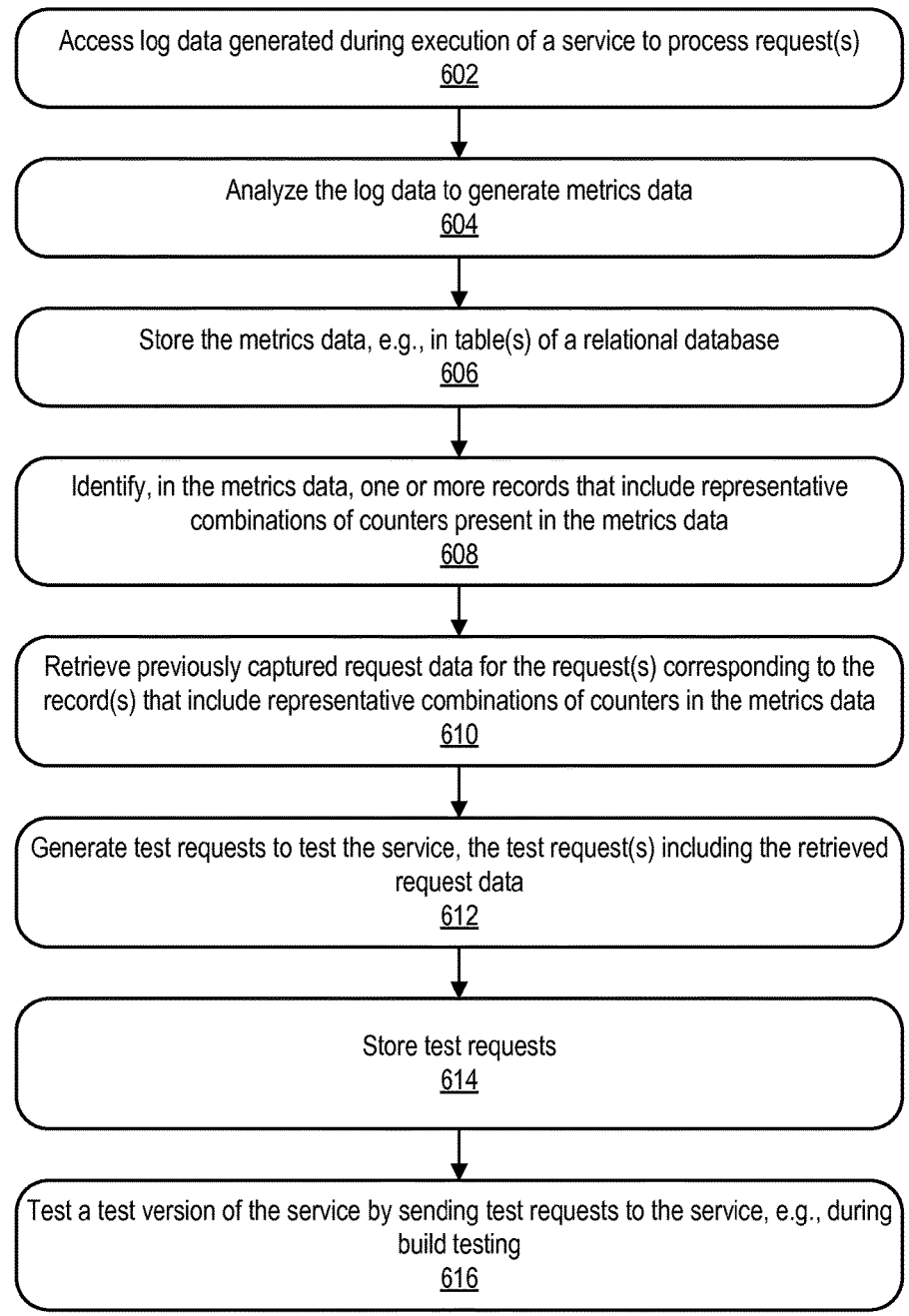
FIG. 6 is a flow diagram illustrating one or more embodiments of a method for generating test cases based on analyzing metrics data.

FIG. 6 is a flow diagram illustrating one or more embodiments of a process for generating test cases based on analyzing the log data 110 and the metrics data 120. Operations of the process may be performed by one or more of the log data analyzer 118, the test case generator 128, other software module(s) executing on the analysis device(s) 116, or other software module(s) executing on other device(s).

At 602, the log data 110 is accessed. As described above, the log data 110 may be generated or collected during execution of the contract service 104A to process one or more requests 108, and the log data 110 may describe one or more code segments of the contract service 104A that were executed or otherwise accessed during the processing of the requests 108.

At 604, the log data 110 is analyzed to generate the metrics data 120. As described above, the metrics data 120 may include a record 122 corresponding to each processed request 108, and a record 122 may include a plurality of counters 126 each indicating whether, or a number of times, a particular code segment was executed during processing of the request 108. At 606, in some embodiments the metrics data 120 may be stored in the storage device(s) 116 or elsewhere. The metrics data 120 may be stored in one or more tables of a relational database or in some other storage format.

At 608, the metrics data 120 may be analyzed to identify a subset of one or more records 122 that each includes a representative combination of the counters 126 present in the metrics data 120, as described above.

At 610, for one or more of the subset of records(s) 122 identified at 608, the request data 112 may be retrieved. As described above, the request data 112 may have been previously captured and stored during the processing of request(s) 108.

At 612, the test request(s) 130 may be generated to include the request data 112 corresponding to the subset of records 122. At 614, in some embodiments the test request(s) 130 may be stored in the storage device(s) 116 or elsewhere.

At 616, the test request(s) 130 may be employed to test the contract service 104B. Testing may include sending the test request(s) 130, with the previously captured request data 112, to the contract service 104B to effectively replay the previous request(s) 108 on a later build of the contract service 104. In some cases, testing may be performed as part of a build process, such as in build verification testing, regression testing, or otherwise. Testing may also include other types of testing, such as performance testing.

In some cases, the test request(s) 130 may be replayed in the contract service 104B to test the contract service 104B in isolation from other service(s) called by the contract service 104B. For example, the contract service 104B may be tested, using the test request(s) 130, while the various communications with network service(s) 206 are replaced with mocked communications, dummy data, or spoofed data that substantially mimics responses (e.g., the service-generated data 210) that may otherwise be received from network service(s) 206 in a production environment.

Figure 7:
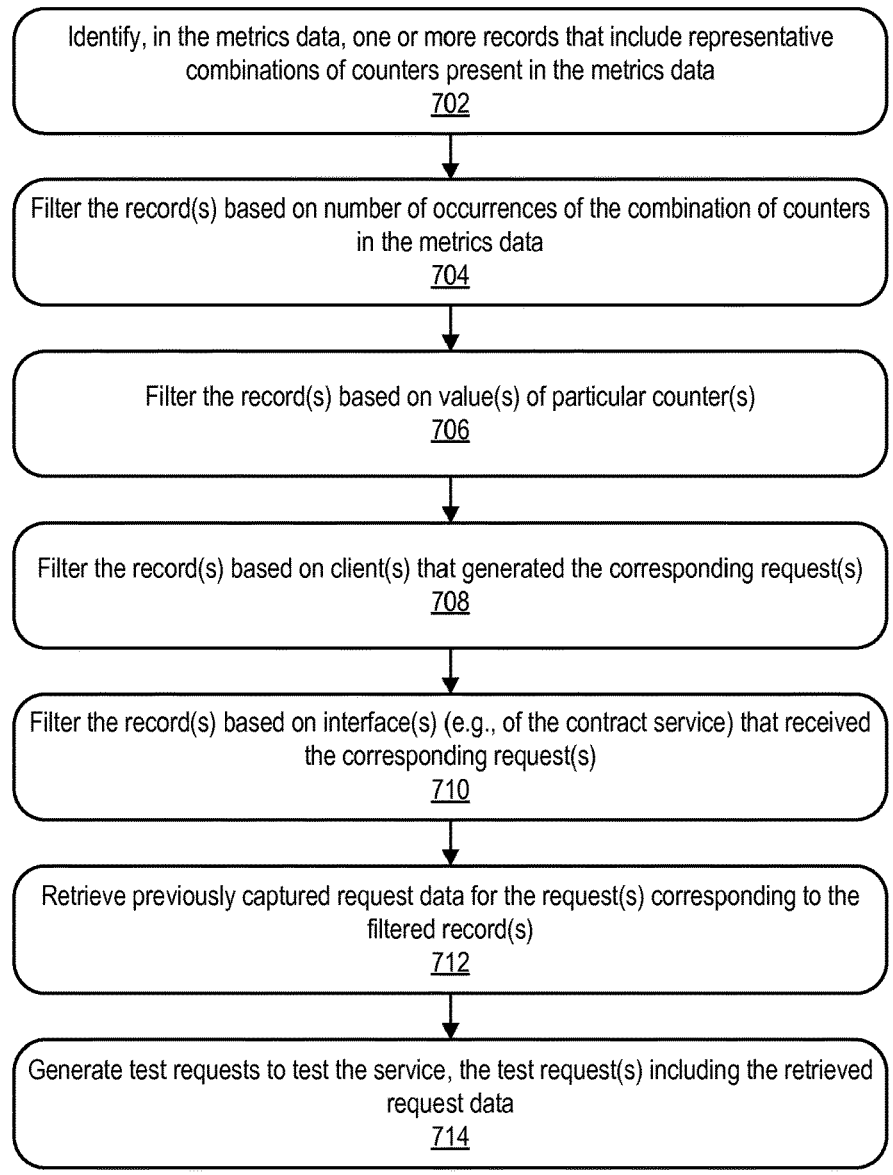
FIG. 7 is a flow diagram illustrating one or more embodiments of a method for generating test cases based on analyzing metrics data, including filtering based on various criteria.

FIG. 7 is a flow diagram illustrating one or more embodiments of a process for generating test cases based on analyzing the metrics data 120, including filtering based on various criteria. Operations of the process may be performed by one or more of the log data analyzer 118, the test case generator 128, other software module(s) executing on the analysis device(s) 116, or other software module(s) executing on other device(s).

At 702, the metrics data 120 may be analyzed to identify a subset of one or more records 122 that each includes a representative combination of the counters 126 present in the metrics data 120, as described above.

In some embodiments, each of the subset of records 122 may be employed to generate a test request 130 to replay its corresponding request data 112 in the contract service 104B. However, in some cases the subset of records 122 exhibiting representative combinations of counters 126 may include too many records 122 to be employed as test requests 130, e.g., given constraints on time or resources available for testing the contract service 104B. Accordingly, in some embodiments the subset of records 122 may be initially filtered based on one or more criteria, and one or more of the subset of records 122 may be employed to generate test request(s) 130.

At 704, in some embodiments the subset of records 122 may be filtered based on a number of occurrences of the combination of counters 126 in the metrics data 120. For example, the subset of records 122 may be filtered to determine those records 122 exhibiting a particular combination of counters 126 that occurred at least a minimum number of times in the metrics data 120.

At 706, in some embodiments the subset of records 122 may be filtered based on particular value(s) of one or more counters 126. For example, the subset of records 122 may be filtered to determine those records 122 for which the value of a particular counter 126 is at least a minimum value.

At 708, in some embodiments, the subset of records 122 may be filtered based on particular client process(es) 106 that generated the requests 108. In some cases, the request(s) 108 generated by different client processes 106 may cause the traversal of different code paths, or different sets of code segments, in the executable code of the contract service 104. Accordingly, embodiments may filter based on client process(es) 106 to ensure that such different code paths are exercised during testing of the contract service 104B. Filtering may be performed to include, in the subset of records 122, at least one record corresponding to a request 108 sent by individual ones of the client processes 106. Filtering may include selecting the records 122 corresponding to a client process 106A instead of other records 122 corresponding to a different client process 106B, and employing the selected records 122 to generate test requests 130. Filtering based on client process 106 may ensure that the code segments are adequately tested for those client process(es) 106 that may generate fewer requests 108 than other, more active client process(es) 106.

In some embodiments, the contract service 104 may expose or otherwise provide a plurality of interfaces, such as application programming interfaces (APIs), through which the client process(es) 106 may submit request(s) 108. At 710, in some embodiments the subset of records 122 may be filtered based on the particular interface(s) that were employed to communicate the request(s) 108 to the contract service 104A. Filtering may be performed to include, in the subset of records 122, at least one record corresponding to a request 108 sent to individual ones of the plurality of interfaces. Embodiments may filter based on interface(s) to ensure that different code paths associated with the different interface(s) are exercised during testing of the contract service 104B.

At 712, for one or more of the records(s) 122 identified at 702 and filtered according to one or more of 704, 706, 708, or 710, the request data 112 may be retrieved. As described above, the request data 112 may have been previously captured and stored during the processing of request(s) 108.

At 714, the request data 112 for the filtered record(s) 122 may be employed to generate test request(s) 130 for testing the contract service 104B, as described above. Embodiments may employ any of the filtering methods described herein, alone or in any combination. Embodiments may also employ other methods for filtering the records 122 to determine test cases.

Figure 8:
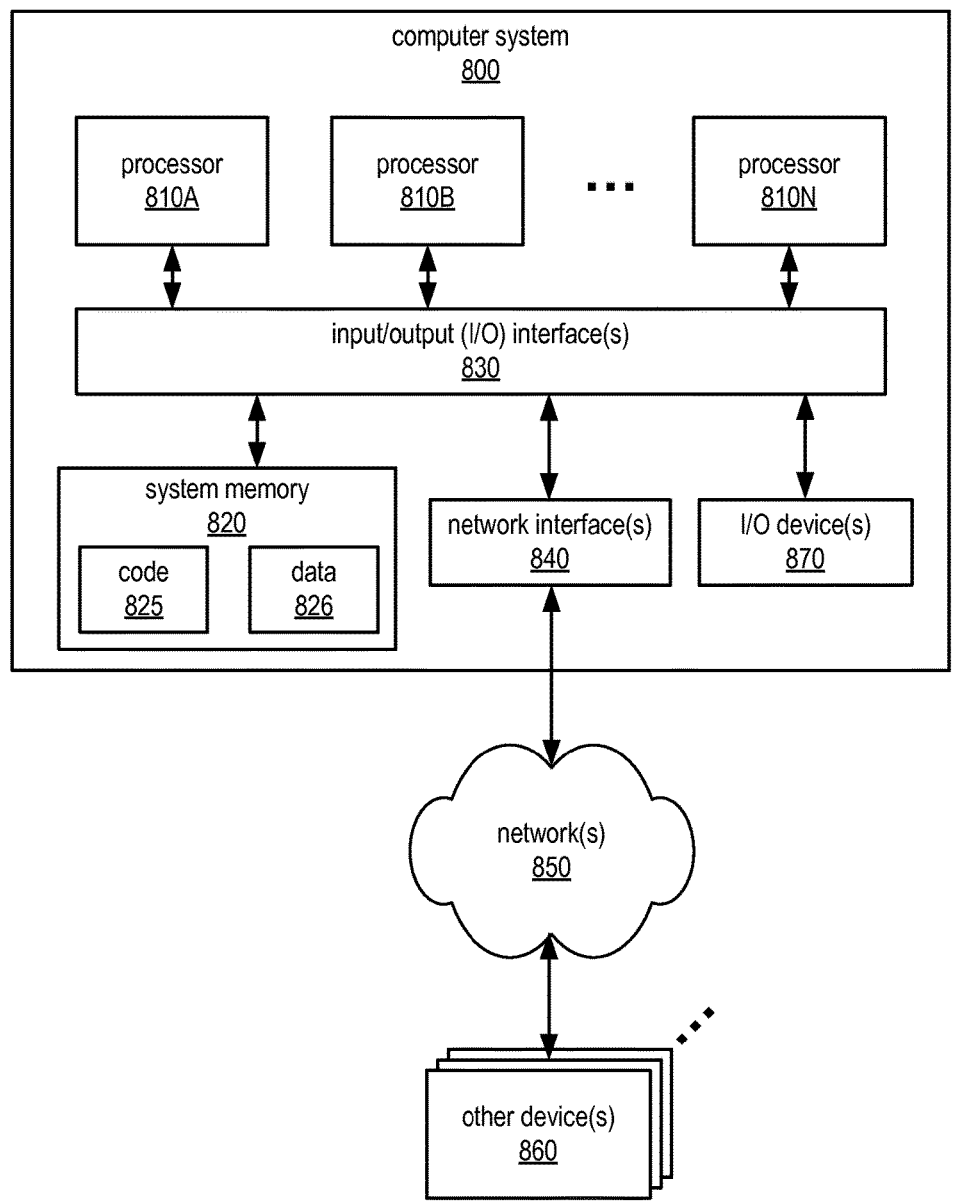
FIG. 8 is a block diagram illustrating a computer system configured to implement one or more embodiments for generating test cases based on metrics data.

FIG. 8 is a block diagram illustrating a computer system 800 configured to implement at least a portion of the queue-based communication described herein according to various embodiments. The computer system 800 may include any number of computing devices, and may execute or otherwise include any number of software modules such as applications, processes, libraries, interfaces, APIs, and so forth. For example, computer system 800 may be configured to implement one or more of the contract processing device(s) 102, the analysis device(s) 116, the storage device(s) 114, end-user client device(s), and so forth. The computer system 800 may include any type of computing device including but not limited to: a personal computer system, a desktop computer, a rack-mounted computing device, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 800 may include one or more physical computing devices. The computing system 800 may also include one or more of a virtual computing environment, a hypervisor, an emulation, or a virtual machine executing on one or more physical computing devices. In some embodiments, the computing system 800 may comprise a cluster, cloud, farm, or other grouping of multiple devices that coordinate operations to provide load balancing, failover support, parallel processing capabilities, shared storage resources, or other aspects.

Computer system 800 may include one or more processors 810 coupled to a system memory 820 via one or more input/output (I/O) interfaces 830. One or more of the processor(s) 810 may include multiple cores, which may be configured to execute single-threaded or multi-threaded code. In various embodiments, computer system 800 may be a uniprocessor system including one processor 810, or a multiprocessor system including multiple processors 810 (e.g., two, four, eight, or any other number). The processor(s) 810 may include any processor(s) capable of executing instructions. For example, in various embodiments, the processor(s) 810 may include general-purpose or embedded processor(s) implementing any of a variety of instruction set architectures (ISAs), such as the x86, PowerPC, SPARC, or MIPS ISAs, or any other ISA. In multiprocessor systems, each of processors 810 may implement the same ISA. Alternatively, different ones of the processors 810 may implement different ISAs.

The computer system 800 may include one or more system memories 820, described herein as system memory 820, configured to store one or more of code 825 or data 826 such that the code 825 and the data 826 are accessible by the processor(s) 810. The system memory 820 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 820 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 820 may be incorporated into the computer system 800. In some cases, at least a portion of the system memory 820 may be external to the computer system 800 and accessible via the network interface(s) 840 or the I/O device(s) 870.

The system memory 820 may include the code 825. The code 825 may include executable instructions that are executable by processor(s) 810 to implement the embodiments described herein. The code 825 may implement one or more executable software modules, such as applications, programs, processes, libraries, interfaces, APIs, scripts, routines, and so forth. The code 825 may be in a compressed or uncompressed form. The code 825 may be in an encrypted or unencrypted form. The code 825 may include any number of instructions that may be employed to program a computing device, or other electronic device, to perform the operations described herein. The code 825 may be arranged in any format and according to any language. In some embodiments, the code 825 may include machine-executable binary instructions that are configured to execute on the processor(s) 810, the instructions generated by compiling, linking, or otherwise processing source code written in any programming language. In some embodiments, the code 825 may include intermediate language instructions (e.g., bytecodes) that execute within a runtime application such as a Java™ Virtual Machine (JVM), C#™ runtime, or any other runtime, interpreter, virtual machine, or execution engine running on the computer system 800. In some embodiments, the code 825 may include instructions written in a scripting language or interpreted language, such as JavaScript™, ActiveScript™, VBScript™, Perl™, and so forth. In such cases, the code 825 may execute within a runtime, interpreter, virtual machine, scripting engine, or other process that executes on the computer system 800.

The code 825 may include instructions to implement one or more of the contract service(s) 104, the client process(es) 106, the log data analyzer 118, the test case generator 128, the data aggregation service 202, the network service(s) 206, or the service call mediator 302. The code 825 may also include instructions to implement at least one operating system (OS) that executes on the computer system 800. The at least one OS may include one or more of the following: any version of the UNIX™ OS; any version of the Linux™ OS; any version of iOS™ or OSX™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The system memory 820 may include data 826 employed during operations of the computer system 800. The data 826 may include one or more of the following: the request(s) 108, the log data 110, the request data 112, the metrics data 120, the test request(s) 130, the shared data object 212, the change tracking data 214, the log data 216, the service-generated data 210, the input data 208, or the service call(s) 204. The data 826 may be stored in any format. In some embodiments, at least a portion of the data 826 may be stored externally to the computer system 800, on one or more other devices or storage media that may communicate with the computer system 800 via the network interface(s) 840, the I/O interface(s) 830, or the I/O device(s) 870. The system memory 820 may include persistent storage such as one or more hard drives, tape drives, solid state memory, other mass storage devices, or any other persistent storage device. The system memory 820 may also include active memory, physical memory, or virtual memory that is employed by processes executing on the computer system 800. The system memory 820 may include cache memory.

The system memory 820 may comprise one or more non-transitory storage media that store information such as one or both of the code 825 or the data 826. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Embodiments may include software comprising one or both of the code 825 or the data 826 stored on the system memory 820 that comprises one or more non-transitory storage media. Such software may be used to program the computer system 800, or other electronic devices, to perform one or more operations according to various embodiments.

Embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 840 and employed to program the computer system 800, or other electronic devices, to perform one or more operations according to various embodiments.

The I/O interface(s) 830 may be configured to coordinate I/O traffic between the processor(s) 810, the system memory 820, and any peripheral devices accessible to the computer system 800 through the network interface(s) 840 or other peripheral interface(s). In some embodiments, the I/O interface(s) 830 may perform protocol, timing or other data transformations to convert data from one component (e.g., the system memory 820) into a format suitable for use by another component (e.g., the processor(s) 810). In some embodiments, the I/O interface(s) 830 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 830 may be split into two or more separate components, such as a north bridge and a south bridge. Moreover, in some embodiments at least some of the functionality of I/O interface(s) 830, such as an interface to the system memory 820, may be incorporated directly into the processor(s) 810.

The computer system 800 may include one or more network interfaces 840 coupled to the I/O interface(s) 830. The one or more network interfaces 840 may be employed by the various components or software of the computer system 800 to communicate with other systems and/or components over one or more communications networks 850. The network interface(s) 840 may include one or more network interface controllers (NICs), transceiver devices, or other types of network communications devices configured to send and receive communications over the network(s) 850.

The computer system 800 may employ the network interface(s) 840 to communicate and exchange data with one or more other devices 860 over the network(s) 850. The network interface(s) 840 may support one or more wireless networking protocols such as any version of the Institute of Electrical and Electronics Engineers (IEEE) 802.11 standard or other wireless networking standard. The network interface(s) 840 may also support communication via any wired data networks, such as Ethernet networks. The network interface(s) 840 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 840 may be configured to enable communication between the computer system 800 and one or more I/O devices 870, or between the computer system 800 and external (e.g., remote) storage device(s). The I/O device(s) 870 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 870 may include one or more data output devices such as a display, an audio output device (e.g., a speaker), a printer, a haptic output device, and so forth.

The I/O device(s) 870 may be components of all the devices included in the computer system 800 or may be components of different devices that comprise the computer system 800. The I/O device(s) 870 may be physically incorporated with the computer system 800. In some embodiments, one or more of the I/O device(s) 870 may be externally placed relative to the computer system 800 and may communicate with the computer system 800 using a wired or wireless connection, such as over the network interface(s) 840. In various embodiments, the computer system 800 may include more, fewer, or different components than those illustrated in FIG. 8.

The network(s) 850 may include public networks such as the Internet, private networks such as an institutional or personal intranet, or some combination of private and public networks. The network(s) 850 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 850 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 850 may be employed for communications between any of the processes or devices depicted in FIGS. 1-3.

The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A method, comprising:
  accessing log data generated during execution of a service to process a plurality of requests, the service comprising a plurality of software modules executing on one or more computing devices, the log data describing a plurality of code segments that are executed in the plurality of software modules during the processing of the plurality of requests;

analyzing the log data to generate metrics data comprising a plurality of records corresponding to the plurality of requests, individual ones of the plurality of records comprising:
- a request identifier (ID) for a request; and
- a plurality of counters associated with the request ID, wherein individual ones of the plurality of counters indicate a number of executions of one of the plurality of code segments caused by the processing of the request;

determining, based at least in part on the metrics data, a plurality of representative combinations of counter values indicating different request processing behaviors of the service;

identifying, in the plurality of records, a subset of records to create a test set, wherein the test set includes records having different representative combinations of counter values corresponding to the different request processing behaviors;

determining, in the plurality of records, a subset of records that includes one or more representative combinations of counter values; and employing the request ID included in one record in the test set to retrieve request data from one or more storage devices, the request data captured during the processing of the request corresponding to the request ID; and generating a test request for testing the service, the test request including the request data.

2. The method of claim 1, wherein:
the method further comprises storing the metrics data in a table;
the plurality of records are stored as a plurality of rows in the table; and
individual ones of the plurality of counters are stored in individual columns of the table.

3. The method of claim 1, wherein:
the service supports an e-commerce service;
the request is to purchase one or more items through the e-commerce service;
processing the request includes generating a purchase contract that includes a plurality of elements; and
individual ones of the plurality of software modules operate independently to determine individual ones of the plurality of elements of the purchase contract.

4. The method of claim 1, wherein:
the log data is generated during the execution of a first version of the service;
the test request is generated to test a second version of the service; and
the second version is a later version of the service than the first version.

5. The method of claim 1, wherein a counter of the plurality of counters has a binary value indicating:
no executions of a code segment during the processing of the request; or
at least one execution of the code segment during the processing of the request.

6. A system, comprising:
one or more hardware computing devices configured to implement one or more services that are configured to:
access log data generated during execution of a service, wherein the log data describes a plurality of code segments of the service that execute during processing of a plurality of requests;

analyze the log data to generate metrics data comprising a plurality of records corresponding to the plurality of requests, wherein individual ones of the plurality of records comprise a plurality of counters for a request, and wherein individual ones of the plurality of counters indicate a number of executions of one of the plurality of code segments during the processing of the request;

determine, based at least in part on the analysis, a plurality of representative combinations of counter values indicating different request processing behaviors of the service;

determine, in the plurality of records, a subset of records that includes one or more representative combinations of counter values corresponding to one or more of the request processing behaviors; and test the service using a test request that includes request data captured during the processing of the request corresponding to one record of the subset of records.

7. The system of claim 6, wherein:
the individual ones of the plurality of records further comprise a request identifier (ID) for the request; and
the one or more services are further configured to employ the request ID included in the one of the subset of records to retrieve the request data from one or more storage devices, the request data previously captured during the processing of the request corresponding to the request ID.

8. The system of claim 6, wherein:
the service supports an e-commerce service; and
the request is to purchase one or more items through the e-commerce service.

9. The system of claim 6, wherein:
the service includes a plurality of software modules executable by the one or more hardware computing devices;
processing the request includes generating an object that includes a plurality of elements; and
individual ones of the plurality of software modules of the service operate independently to determine individual ones of the plurality of elements of the object.

10. The system of claim 9, wherein at least one of the plurality of software modules calls a remote service to determine one of the plurality of elements of the object.

11. The system of claim 6, wherein the log data is generated, during the execution of the service, by one or more of:
an instruction compiled from one or more lines in source code of the service;
an instruction inserted into executable code of the service during compilation of the source code;
an instruction inserted into the executable code of the service during the execution of the service; or
a framework configured to mediate calls made by the service to other services.

12. The system of claim 6, wherein:
the log data includes at least one indication that a code branch was followed during the execution of the service; and
the metrics data includes a counter indicating a number of instances in which the code branch was followed.

13. The system of claim 6, wherein:
the plurality of requests are sent to the service via a plurality of interfaces provided by the service; and the subset of records is determined to include at least one record corresponding to a request sent to individual ones of the plurality of interfaces.

14. The system of claim 6, wherein:
the plurality of requests are sent to the service by a plurality of client processes; and
the subset of records is determined to include at least one record corresponding to a request sent by individual ones of the plurality of client processes.

15. One or more non-transitory computer-readable media storing instructions which, when executed on one or more processors, cause the one or more processors to perform operations comprising:
accessing log data generated during execution of a service, the log data describing a plurality of code segments of the service that are executed;
analyzing the log data to generate metrics data comprising a plurality of records, individual ones of the plurality of records corresponding to a plurality of requests, wherein individual ones of the plurality of records comprise a plurality of counters for a request, and wherein individual ones of the plurality of counters indicate a number of executions of one of the plurality of code segments during the processing of the request;
determining, based at least in part on the analysis, a plurality of representative combinations of counter values indicating different request processing behaviors of the service;
determining, in the plurality of records, a subset of records that includes one or more representative combinations of counter values corresponding to one or more of the request processing behaviors; and
generating a test case for testing the service, the test case corresponding to one record of the subset of records.

16. The one or more non-transitory computer-readable media of claim 15, the operations further comprising:
determining intermediate data in a key-value format, wherein a record of the intermediate data comprises:
a key that includes a request identifier and a code segment identifier; and
a value of a counter.

17. The one or more non-transitory computer-readable media of claim 15, the operations further comprising:
selecting the one of the subset of records based, at least in part, on a value of at least one of the plurality of counters being greater than a threshold value for the selected one of the subset of records.

18. The one or more non-transitory computer-readable media of claim 15, wherein determining the subset of records is further based on the one or more representative combinations of counter values being present in at least a threshold number of the plurality of records.

19. The one or more non-transitory computer-readable media of claim 15, wherein:
the log data is generated during the execution of the service to process the plurality of requests; and
the individual ones of the plurality of records generated from the log data comprise a request identifier (ID) for one of the plurality of requests.

20. The one or more non-transitory computer-readable media of claim 19, wherein:
the service includes a plurality of software modules executable by the one or more computing devices;
processing a request includes generating an object that includes a plurality of elements; and
individual ones of the plurality of software modules of the service operate independently to determine individual ones of the plurality of elements of the object.

* * * * *